ABSTRACT

United States Patent [19]

Resconi et al.

[11] Patent Number: 6,111,046

[45] Date of Patent: *Aug. 29, 2000

[54] ATACTIC COPOLYMERS OF PROPYLENE WITH ETHYLENE

[75] Inventors: Luigi Resconi; Fabrizio Piemontesi, both of Ferrara, Italy

[73] Assignee: Montell Technology Company BV, Hoofddorp, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/609,620

[22] Filed: Mar. 1, 1996

[30] Foreign Application Priority Data

Mar. 3, 1995 [IT] Italy .................................. MI95A0411

[51] Int. Cl.⁷ .................................................. C08F 210/06
[52] U.S. Cl. ....................... 526/348; 526/125.1; 526/158; 526/160; 526/170; 502/104
[58] Field of Search ................. 526/348, 125.1, 526/158, 160, 170; 502/104

[56] References Cited

U.S. PATENT DOCUMENTS 4,859,757  8/1989  Pellon et al. ........................ 526/125.8
5,369,196  11/1994 Matsumoto et al. .................... 526/160
5,637,665  6/1997  Sustic et al. ............................ 526/348

FOREIGN PATENT DOCUMENTS 0 074 194 A2   3/1983   European Pat. Off. .
0074194        3/1983   European Pat. Off. .
0 232 201 A2   8/1987   European Pat. Off. .
0 643 078 A2   3/1989   European Pat. Off. .
0 604 908 A2   7/1994   European Pat. Off. .
0 604 917 A2   7/1994   European Pat. Off. .
0 632 066 A1   1/1995   European Pat. Off. .

*Primary Examiner*—David W. Wu
*Assistant Examiner*—Ling-Siu Choi
*Attorney, Agent, or Firm*—Bryan Cave LLP; Maurice B. Stiefel

[57] ABSTRACT

Amorphous polymers of propylene modified with ethylene units are prepared in high yields, by carrying out the polymerization reaction in the presence of a catalyst based on a metallocene compound that has two bridged fluorenyl ligands. These copolymers have glass transition temperatures ($T_g$) well below 0° C., making it possible for the products manufactured from them to be used at low temperatures.

6 Claims, No Drawings

ATACTIC COPOLYMERS OF PROPYLENE WITH ETHYLENE

BACKGROUND OF THE INVENTION

1. Field of the Invention

The present invention relates to atactic copolymers of propylene with ethylene and to the process for their preparation.

2. Description of Related Art

As is well known, the products of homopolymerization of propylene can be crystalline or amorphous. Whereas the polypropylene possessing isotactic or syndiotactic structure is crystalline, the polypropylene with substantially atactic structure proves to be amorphous. Atactic polypropylene, in the representation with Fisher formula as described in "M. Farina, Topics Stereochem., 17, (1987), 1–111", has the methyl groups arranged randomly on one or other side of the polymer chain. As described in the aforementioned publication, useful information about the structure can be obtained from NMR analysis.

The commercially available amorphous polypropylene is mainly used in adhesive compositions and as an additive in bitumens. It is usually a by-product of isotactic polypropylene obtained in the presence of catalysts of the Ziegler-Natta type. However, separation of the small fractions of amorphous polypropylene from the rest of the product requires expensive processes of solvent separation.

Using catalysts of the metallocene type, generally polypropylene is obtained that has a high degree of crystallinity. Nevertheless, some metallocene catalytic systems are able to polymerize propylene to amorphous polypropylene. These polymers are, however, generally characterized by low molecular weight.

More recently, by polymerizing propylene in the presence of particular metallocene compounds, amorphous polymers of propylene have been prepared which have a high molecular weight.

In particular, European Application EP-A-604 917 describes an amorphous polymer of propylene which can be obtained directly by the reaction of polymerization of propylene, and has the following characteristics:

(a) intrinsic viscosity $[\eta] > 1$ dl/g;
(b) % syndiotactic diads (r)–% isotactic diads (m)>0;
(c) less than 2% of the $CH_2$ in sequences $(CH_2)_n$, with $n \geq 2$;
(d) Bernoullian index (B)=1±0.2.

The aforementioned amorphous polypropylene possesses interesting elastomeric properties. Nevertheless, its glass transition temperature ($T_g$) is found to be relatively high (around 0° C.), so that goods manufactured from this polymer cannot be used at low temperatures. European Application EP-A-604 908 gives examples of amorphous copolymers of propylene with higher α-olefins and these have $T_g$ values below 0° C. However, to achieve a significant lowering of $T_g$ it is necessary to introduce large quantities of comonomer, producing polymers with characteristics somewhat different from amorphous polypropylene.

The amorphous polypropylene described in EP-A-604 917 can be obtained from the reaction of polymerization of propylene carried out in the presence of a catalyst, described in the cited European Application EP-A-604 908, based on a metallocene that has two fluorenyl ligands with a bridge between them. However, the polymerization yields are not satisfactory. Furthermore, it is not possible to control the molecular weight of the polymers by using hydrogen as a molecular weight regulator, because this causes poisoning of the catalyst.

SUMMARY OF THE INVENTION

It has now unexpectedly been found that, if the reaction of polymerization of propylene with a catalyst system of the type described in the cited European Application EP-A-604 908 is carried out in the presence of small amounts of ethylene it is possible to obtain, with improved yields, amorphous polymers of propylene modified with ethylene units having $T_g$ values well below 0° C. even with relatively small amounts of comonomer units, and having also controlled molecular weights.

Therefore, in accordance with an aspect of the present invention, there are provided amorphous copolymers of propylene with ethylene, with a content of units derived from the ethylene of between about 1 and 35% by moles, in which less than 2% of the $CH_2$ groups in the polymer chain are present in $(CH_2)_n$ sequences where n is an even number.

According to another aspect of the present invention there is provided a method for the preparation of the above described copolymers of propylene.

DESCRIPTION OF THE PREFERRED EMBODIMENTS

In the copolymers of propylene according to the present invention, the content by moles of monomer units derived from the ethylene is preferably comprised between about 3% and 30% and, more preferably, between about 5% and 20%.

The copolymers of propylene according to the present invention possess an atactic structure and therefore are substantially amorphous. Their enthalpy of fusion ($\Delta H_f$) cannot generally be measured.

$^{13}$C-NMR analysis supplies information on the tacticity of the polymer chains, the composition of the polymer and the distribution of the comonomer within the polymer chains.

The structure of the aforementioned polymers of propylene is substantially atactic. It is observed that the syndiotactic diads (r) are more numerous than the isotactic diads (m). Generally, the value of the relation % r–% m is higher than 0, particularly higher than 5, more particularly higher than 10.

In the copolymers of the invention the ethylene units in the polymer chain are much more isolated relative to a Bernoullian or random statistical distribution, with an equal content of ethylene units in the chain. Thus, the copolymers of the invention contain an extremely low number of sequences of two or more consecutive ethylene units.

The distribution of the ethylene units in the copolymers of the invention was analysed by means of $^{13}$C-NMR. Assignment was effectued as described by Tritto I. et al. in "Macromolecules" 1995, 28, 3342. The distribution of the triads is calculated from the following relations:

$$EEE = \tfrac{1}{2}S_{\delta\delta} + \tfrac{1}{4}S_{\gamma\delta}\ PEE = S_{\beta\delta}\ EPE = T_{\delta\delta}$$

$$PEP = \tfrac{1}{2}S_{\beta\beta} + \tfrac{1}{4}S_{\alpha\gamma}\ PPE = 2S_{\alpha\alpha} - 2T_{\beta\beta}\ PPP = T_{\beta\beta}$$

where EEE, PEE, EPE, PEP, PPE and PPP represent, respectively, the sequences ethylene/ethylene/ethylene, propylene/ethylene/ethylene, ethylene/propylene/ethylene, propylene/ethylene/propylene, propylene/propylene/ethylene and propylene/propylene/propylene in the copolymer. The values are normalized. The higher the number of isolated ethylenic units in the chain, the more the values of the ratio PEP/(PEP+PEE+EEE) become closer to the unit. For the copolymer of the present invention, the value of the ratio PEP/(PEP+PEE+EEE) is generally higher than 0.8. The number of ethylene sequences is clearly dependent on the amount of ethylenic units present in the chain. The copolymers of the invention having a content of ethylene units of up to about 10% by moles do not show ethylenic sequences along the chain and, therefore, the value of the ratio PEP/(PEP+PEE+EEE) for those copolymers is 1.

In particular, in the copolymers of the invention the percentage molar content of ethylene (% E) and the ratio PEP/(PEP+PEE+EEE) satisfy the following relationship:

$$0.012\%\ E + PEP/(PEP+PEE+EEE) \geq 1$$

preferably:

$$0.01\%\ E + PEP/(PEP+PEE+EEE) \geq 1$$

more preferably:

$$0.008\%\ E + PEP/(PEP+PEE+EEE) \geq 2$$

The *Cluster Index* (C.I.) is defined, in accordance with J. C. Randall "Journ. Macromol. Sc. - Rev. Chem. Phys. 1989, C20, 201, as:

$$C.I.(E) = 1 - ([PEP]_{obs} - [PEP]_{bern})/([E] - [PEP]_{bern})$$

$$C.I.(P) = 1 - ([EPE]_{obs} - [EPE]_{bern})/([P] - [EPE]_{bern})$$

where [E] and [P] are the molar fractions of ethylene and propylene units respectively in the copolymer;

$[PEP]_{obs}$ and $[EPE]_{obs}$ are the normalized experimental concentrations of the propylene/ethylene/propylene and ethylene/propylene/ethylene sequences respectively in the copolymer;

$[PEP]_{bern}$ and $[EPE]_{bern}$ are the normalized concentrations of the propylene/ethylene/propylene and ethylene/propylene/ethylene sequences respectively in a random (or Bernoullian) copolymer, i.e.:

$$[PEP]_{bern} = [E] \cdot (1-[E])^2$$

$$[EPE]_{bern} = [P] \cdot (1-[P])^2$$

where [E] and [P] are calculated as follows:

$$[E] = [EEE] + [EEP] + [PEP]$$

$$[P] = [PPP] + [PPE] + [EPE]$$

When C.I.=1 we have a random (or Bernoullian) copolymer. The larger the extent by which the value of C.I. is higher than unity, the more the copolymer consists of blocks. Conversely, the greater the extent by which the value of C.I. is lower than unity, the more the comonomer is isolated in the polymer chain and therefore the copolymer is called "super-random".

In the case of the copolymers of the present invention, the values of C.I.(E) are well below unity, generally lower than 0.7, preferably lower than 0.5, more preferably lower than 0.3.

The structure of the copolymers according to the invention is found to be highly regioregular. Thus, $^{13}$C-NMR analysis does not detect signals relating to $(CH_2)_n$ sequences, where n is an even number. Preferably, less than 1% of the $CH_2$ groups in the chain is contained in $(CH_2)_n$ sequences, where n is an even number.

The polymers of the invention are found to have molecular weights that are of interest industrially. Thus, the aforementioned polymers have values of intrinsic viscosity (I.V.) that are generally higher than 0.5 dl/g and even higher than 1.0 dl/g.

In general, the polymers of the invention are found to have a narrow molecular weight distribution. An index of the molecular weight distribution is given by the ratio $M_w/M_n$ which, for the copolymers of the invention, is generally lower than 4, preferably lower than 3.5 and, more preferably, lower than 3.

The copolymers of the invention are generally soluble in the usual solvents, e.g. hexane, heptane and toluene.

The copolymers of the invention can be prepared by a process which comprises the reaction of polymerization of mixtures of propylene and ethylene in the presence of a catalyst comprising the product of the reaction between:

(A) a metallocene compound of formula (I):

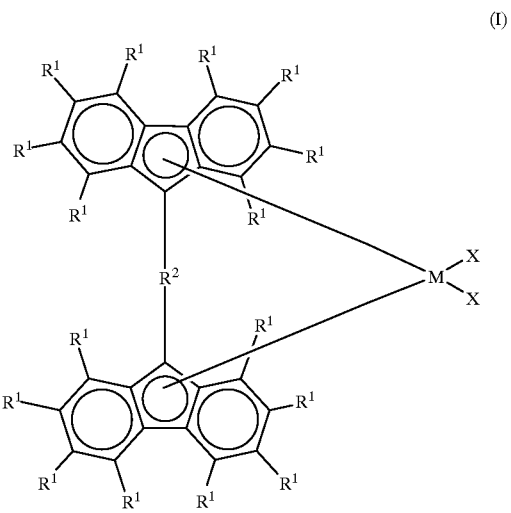

(I)

in which the substituents $R^1$, which may be identical or different, are hydrogen atoms, $C_1$–$C_{20}$ alkyl radicals, $C_3$–$C_{20}$ cycloalkyl radicals, $C_2$–$C_{20}$ alkenyl radicals, $C_6$–$C_{20}$ aryl radicals, $C_7$–$C_{20}$ alkaryl radicals or $C_7$–$C_{20}$ aralkyl radicals, possibly two adjacent substituents $R^1$ can form a ring comprising from 5 to 8 carbon atoms, and furthermore the substituents $R^1$ can contain atoms of Si or Ge;

the $R^2$ bridging group is selected from among $>CR^1_2$, $>SiR^1_2$, $>GeR^1_2 >NR^1$ or $>PR^1$, where $R^1$ is defined as above and possibly, when $R^2$ is $>CR^1_2$, $>SiR^1_2$ or $>GeR^1_2$, the two substituents $R^1$ can form a ring comprised of 3 to 8 atoms;

M is an atom of a transition metal selected from among those belonging to group 3, 4, 5, or to the lanthanides group or the actinides group in the Periodic Table of the Elements (new IUPAC version); the substituents X, which may be identical or different, are halogen atoms, —OH, —SH, $R^1$, —$OR^1$, —$SR^1$, —$NR^1_2$ or —$PR^1_2$, where $R^1$ is defined as above;

possibly as the product of reaction with an organometallic compound of aluminium of formula $AlR^4_3$ or $Al_2R^4_6$, in which the substituents $R^4$, which may be identical or different, are $R^1$ or halogen, and (B) an aluminoxane, if necessary mixed with an organometallic compound of aluminium of formula $AlR^4_3$ or $Al_2R^4_6$, in which the substituents $R^4$, which may be identical or different, are defined as above, or one or more compounds capable of forming a cationic alkyl metallocene.

The $R^2$ bridging group is preferably a $>SiR^1_2$ or $>GeR^1_2$ group.

The transition metal M is preferably chosen from among titanium, zirconium and hafnium, zirconium being particularly preferred.

Metallocene compounds with the formula (I) that are particularly suitable are those in which the substituents $R^1$ are hydrogen atoms, the $R^2$ bridging group is a $>SiR^1_2$ or $>GeR^1_2$ group, preferably it is a $>Si(CH_3)_2$ group, more preferably a $>Si(n-C_4H_9)_2$ group, N is a zirconium atom and the substituents X are halogen atoms or $R^1$ groups, and are preferably chlorine atoms or methyl radicals.

Non-limitative examples of these compounds are: dimethylsilanediylbis(fluorenyl)titanium dichloride, dimethylsilanediylbis(fluorenyl)zirconium dichloride, dimethylsilanediylbis(fluorenyl)hafnium dichloride, dimethylsilanediylbis(fluorenyl)titanium dimethyl, dimethylsilanediylbis(fluorenyl)zirconium dimethyl, dimethylsilanediylbis(fluorenyl)hafnium dimethyl, di(n-butyl)silanediylbis(fluorenyl)titanium dichloride, di(n-butyl)silanediylbis(fluorenyl)zirconium dichloride, di(n-butyl)silanediylbis(fluorenyl)hafnium dichloride, di(n-butyl)silanediylbis(fluorenyl)zirconium dimethyl, di(n-butyl)silanediylbis(fluorenyl)hafnium dimethyl.

The aluminoxane used as component (B) can be obtained by reaction between water and an organometallic compound of aluminium of formula $AlR^4_3$ or $Al_2R^4_6$, in which the substituents $R^4$, which may be identical or different, are defined as above, with the condition that at least one $R^4$ is different from halogen. In that case, they are caused to react in Al/water molar ratios between about 1:1 and 100:1.

The molar ratio between aluminium and the metal of the metallocene compound is between about 10:1 and about 5000:1, and preferably between about 100:1 and about 4000:1.

The aluminoxane used in the process of the invention is considered to be a linear, branched or cyclic compound, containing at least one group of the type:

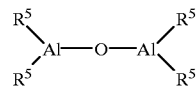

wherein the substituents $R^5$, which may be identical or different, are $R^1$ or a group —O—$Al(R^5)_2$, and possibly some $R^5$ can be halogen atoms. The radicals $R^1$ are preferably methyl, ethyl, isobutyl or 2,4,4-trimethyl-pentyl groups.

Examples of aluminoxanes suitable for use according to the present invention are methylalumoxane (MAO), isobutylaluminoxane (TIBAO) and 2,4,4-trimethylpentylalumoxane (TIOAO), the methylalumoxane being preferred. Mixtures of differents alumoxanes are suitable as well.

Non-limitative examples of compounds of aluminium of formula $AlR^4_3$ or $Al_2R^4_6$ are: $Al(Me)_3$, $Al(Et)_3$, $AlH(Et)_2$, $Al(iBu)_3$, $AlH(iBu)_2$, $Al(iHx)_3$, $Al(iOct)_3$, $AlH(iOct)_2$, $Al(C_6H_5)_3$, $Al(CH_2C_6H_5)_3$, $Al(CH_2CMe_3)_3$, $Al(CH_2SiMe_3)_3$, $Al(Me)_2iBu$, $Al(Me)_2Et$, $AlMe(Et)_2$, $AlMe(iBu)_2$, $Al(Me)_2iBu$, $Al(Me)_2Cl$, $Al(Et)_2Cl$, $AlEtCl_2$, $Al_2(Et)_3Cl_3$, where Me=methyl, Et=ethyl, iBu=isobutyl, iHx=isohexyl, iOct=2,4,4-trimethyl-pentyl.

Among the above mentioned aluminium compounds, trimethylaluminium and triisobutylaluminium are preferred.

Non-limitative examples of compounds capable of forming a cationic alkyl metallocene are compounds of formula $Y^+Z^-$, where $Y^+$ is a Brønsted acid, capable of donating a proton and of reacting irreversibly with a substituent $R^2$ of the compound with formula (I) and $Z^-$ is a compatible anion, which does not coordinate, which is able to stabilize the active catalytic species that originates from the reaction of the two compounds, and which is sufficiently labile so that it can be displaced from an olefinic substrate. Preferably the anion $Z^-$ comprises one or more boron atoms. More preferably the anion $Z^-$ is an anion of formula $BAr_4(^-)$, where the substituents Ar, which may be identical or different, are aryl radicals such as phenyl, pentafluorophenyl, bis(trifluoromethyl)phenyl. Tetrakis(pentafluorophenyl)borate is particularly preferred. Moreover, compounds with the formula $BAr_3$ can be used conveniently.

The catalysts used in the process of the present invention can also be used on inert supports. This is achieved by depositing the metallocene compound (A), or the product of its reaction with component (B), or component (B) and then the metallocene compound (A), on inert supports such as silica, alumina, styrene-divinylbenzene copolymers, polyethylene and polypropylene.

The solid compound thus obtained, in combination with further addition of alkyl aluminium compound either as it is or pre-reacted with water, if necessary, is useful for use in gas-phase polymerization.

The process of copolymerization of propylene with ethylene according to the present invention can be conducted in the liquid phase, in the liquid mixture of the monomers or in the presence of an inert aromatic hydrocarbon solvent, for example toluene, or an aliphatic one, e.g. n-hexane, or in the gas phase.

The polymerization temperature is generally between 0° C. and 150° C., in particular between 20° C. and 100° C., and more particularly between 30° C. and 80° C.

The molecular weight of the copolymers can be varied simply by varying the polymerization temperature, the type or the concentration of the catalytic components or, and this constitutes an advantage of the invention, by varying the content of units derived from ethylene in the polymer chain.

The molecular weight distribution can be varied by using mixtures of different metallocene compounds, or by effecting polymerization in several stages that differ with respect to the polymerization temperatures and/or the concentrations of molecular weight regulator.

The polymerization yields depend on the purity of the metallocene component of the catalyst. Therefore the metallocene compounds obtained by the process of the invention can be used as they are, or after undergoing a purification treatment. The yields of the process of the invention are higher, however, than those in preparation of the corresponding amorphous homopolymers of propylene, and this constitutes a further advantage of the invention.

The components of the catalyst can be brought into contact with each other prior to polymerization. The time of contact is generally between 1 and 60 minutes, and preferably between 5 and 20 minutes.

The following examples are given to illustrate the invention and are non-limitative.

CHARACTERIZATIONS

The content of comonomer units of ethylene in the copolymer and the quantity of ethylene units isolated in the chain were determined by $^{13}$C-NMR analysis.

The $^{13}$C-NMR analyses of the copolymers were effected using a Bruker AC200 instrument, at a temperature of 120° C., on samples prepared by dissolving about 60–80 mg of polymer in 0.5 cc of $C_2D_2Cl_4$. The spectra were recorded with the following parameters:

Relaxation delay=12 sec,

Number of scans=4000–6000.

Measurements by differential scanning calorimetry (DSC) were effected using a DSC-7 instrument from Perkin Elmer Co. Ltd. according to the following procedure. About 10 mg of sample are cooled to –100° C., then they are heated to +100° C. at a scanning rate equal to 20° C./minute. The sample is then cooled to –100° C. at a scanning rate equal to 80° C./minute, and held at this temperature for 1 minute. Then a second scan is effected under the same conditions as the first. The values reported are those obtained in the second scan. Glass transition temperature was obtained as the inflection point of the heating trace.

The intrinsic viscosity [η] was measured in tetralin at 135° C.

PREPARATION OF THE CATALYTIC COMPONENTS DIMETHYLSILANEDIYL-BIS(FLUORENYL)ZIRCONIUM DICHLORIDE

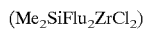

(a) Synthesis of the ligand 120 ml (0.30 mol) of a solution of n-butyllithium 2.5 M in hexane were added dropwise to a solution obtained by dissolving 50 g (0.30 mol) of fluorene in 400 ml of tetrahydrofuran (THF), while stirring, at a temperature of 0° C. After addition, the solution was raised to room temperature and stirring was continued for a further 5 hours until gas had ceased to be evolved.

The solution thus obtained, containing fluorene anions, was added dropwise to a solution obtained by dissolving 19.4 g (0.15 mol) of dimethyldichlorosilane in 100 ml of THF, while stirring, at a temperature of 0° C. After addition, the solution was raised to room temperature and stirring was continued for a further 17 hours.

Reaction was then interrupted by adding 150 ml of water, and the organic layer was dried over magnesium sulphate. Then, with the aim of removing the solvents, vacuum was applied, and the solids thus collected were recrystallized from hexane.

37.8 g of dimethylbisfluorenylsilane with the formula $(CH_3)_2Si(Flu)_2$ were obtained, where Flu=fluorenyl, the structure and chemical purity being confirmed by GC-MS and $^1$H-NMR.

(b) Synthesis of the metallocene 31.25 ml of a solution of methyllithium 1.4 M in $Et_2O$ were added dropwise to a solution prepared by dissolving 8.5 g (0.0219 mol) of the ligand $(CH_3)_2Si(Flu)_2$ obtained at point (A) in 75 ml of diethylether ($Et_2O$), while stirring, at a temperature of 0° C. After addition, the suspension obtained was raised to room temperature and stirring was continued for a further 5 hours until gas had ceased to be evolved.

Then the suspension was filtered, obtaining a bright yellow powder, which was washed with $Et_2O$ and pentane.

The dianion of the ligand thus obtained was resuspended in 100 ml of $Et_2O$ and then added dropwise to a suspension of 5.1 g (0.0219 mol) of $ZrCl_4$ in 150 ml of pentane, with vigorous stirring, at a temperature of –78° C.

After addition, the suspension obtained was raised to room temperature, and stirring was continued for a further 17 hours.

Then the suspension was dried, and 13.56 g of product were obtained.

DIBUTYLSILANEDIYL-BIS(FLUORENYL) ZIRCONIUM DICHLORIDE

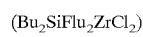

(a) Synthesis of the ligand 23.27 g (140 mmol) of fluorene were dissolved in 100 ml of $Et_2O$ and the temperature of the solution was adjusted to –78° C. Then 140 ml of a solution of methyllithium 1.4 M in $Et_2O$ were added dropwise. After addition, the solution was raised to room temperature and stirring was continued for one night.

The solution thus obtained was added dropwise to a solution obtained by dissolving 14.9 g (70 mmol) of di(n-butyl)dichlorosilane, in 50 ml of $Et_2O$, while stirring, at a temperature of –78° C. After addition, the solution was raised to room temperature and stirring was continued for one night.

The reaction was then interrupted by adding a saturated solution of $NH_4Cl$, and the organic layer was collected and dried over magnesium sulphate. Then, for the purpose of removing the solvents, vacuum was applied, and the solids thus collected were washed with $CH_3OH$ and dried thoroughly in vacuum.

23.39 g of di(n-butyl)bisfluorenylsilane were obtained (yield 70.7%), and its chemical purity was confirmed by GC (97%).

(b) Synthesis of the metallocene 4.72 g of di(n-butyl)bis(9-fluorenyl)silane (10 mmol) were dissolved in 100 ml of $Et_2O$ and the temperature of the solution was adjusted to −78° C. Then 14.2 ml (20 mmol) of a solution of methyllithium 1.4 M in $Et_2O$ were added dropwise, while stirring. After addition, the solution was raised to room temperature and stirring was continued for one night.

The solution of the dianion of the ligand was added dropwise into a flask in which 2.33 g (10 mmol) of $ZrCl_4$ had been suspended in 70 ml of pentane, after adjusting the temperature to −78° C. After addition, the solution was raised to room temperature and stirring was continued for one night. The solids were collected by filtration and washed with $Et_2O$. The product was then washed repeatedly with $CH_2Cl_2$ and collected by filtration. Then the $CH_2Cl_2$ was removed under vacuum, obtaining a bright red, free-flowing powder. Yield 5.54 g (87%) of di(n-butyl)silanediyl-bis(9-fluorenyl)zirconium dichloride.

MODIFIED METHYLALUMOXANE (M-MAO)

A commercial product (ethyl) in solution (62 g Al/l) in isopar C was used as such.

POLYMERIZATIONS

EXAMPLES 1–2

400 g of propylene were loaded into a 1.0-liter jacketed Büchi autoclave made of steel, equipped with a magnetic-drive helicoidal stirrer, with 35 $cm^3$ barrel and thermal resistance, connected to a thermostat for temperature control, washed with a solution of $Ali-Bu_3$ in hexane and then dried to 60° C. in a nitrogen stream. The autoclave was then thermostated at 48° C.

The catalyst/cocatalyst mixture was prepared by dissolving the quantities of metallocene shown in Table 1 with the solution of M-MAO, then diluting with a small quantity of hexane, obtaining a solution with a deep colour, which was stirred for 10 minutes at room temperature and then injected into the autoclave from the barrel by means of ethylene pressure. The temperature was raised quickly to 50° C. and polymerization was carried out at constant temperature for one hour.

The polymerization conditions are shown in Table 1. The data relating to characterization of the polymers obtained are presented in Table 2. DSC analysis did not show any peak attributable to the enthalpy of fusion. $^{13}C$-NMR analysis did not detect signals relating to the $(CH_2)_n$ sequences, where n is an even number.

EXAMPLES 3–4 (COMPARISON)

The procedure described in Examples 1–2 was followed, but without ethylene, and injecting the catalyst/cocatalyst mixture into the autoclave by means of propylene pressure.

The polymerization conditions are given in Table 1. The data relating to characterization of the polymers obtained are shown in Table 2. DSC analysis did not show any peak attributable to the enthalpy of fusion. $^{13}C$-NMR analysis did not detect signals relating to $(CH_2)_n$ sequences, where n is an even number.

EXAMPLES 5–7

An ethylene/propylene mixture, in the molar ratios shown in Table 1, was loaded at room temperature into a 4.25-liter jacketed autoclave made of steel, equipped with a magnetic-drive stirrer, 100 $cm^3$ barrel and thermal resistance, dried at 70° C. in a propylene stream.

Then the autoclave was thermostated at 50° C. and 5 ml of the catalyst/cocatalyst mixture, prepared as described in Examples 1–2, were injected into the autoclave from the barrel by means of ethylene pressure. Polymerization was conducted at constant temperature for two hours, maintaining constant pressure in the reactor by addition of an ethylene/propylene mixture in the same molar ratios as initially. Polymerization was stopped by adding 600 ml of CO, the unreacted monomers were exhausted and the polymer was dried under vacuum at 70° C. for two hours.

The polymerization conditions are shown in Table 1. The data relating to characterization of the polymers obtained are given in Table 2. DSC analysis did not show any peak attributable to the enthalpy of fusion. $^{13}C$-NMR analysis did not detect signals relating to $(CH_2)_n$ sequences, where n is an even number.

TABLE 1

| EXAMPLE | metallocene type | (mg) | Al/Zr (mol) | C3/(C3 + C2) (mol %) | yield (g) | activity ($Kg_{pol}/g_{mer} \cdot h$) |
|---|---|---|---|---|---|---|
| 1 | $Me_2SiFlu_2ZrCl_2$ | 0.5 | 2000 | — | 48.36 | 96.7 |
| 2 | $Bu_2SiFlu_2ZrCl_2$ | 0.5 | 2000 | — | 85.58 | 171.1 |
| 3 COMP. | $Me_2SiFlu_2ZrCl_2$ | 0.87 | 2000 | 100.00 | 27.25 | 31.3 |
| 4 COMP. | $Bu_2SiFlu_2ZrCl_2$ | 1 | 2000 | 100.00 | 54.85 | 54.8 |
| 5 | " | 1 | 2000 | 98.67 | 287.75 | 143.9 |
| 6 | " | 2 | 500 | 98.67 | 299.88 | 75.0 |
| 7 | " | 2 | 500 | 99.50 | 191.88 | 45.0 |

TABLE 2

| EXAMPLE | ethylene (mol %) | N.M.R. characterizations | | | | | | | | PEP/(PEP + PEE + EEE) | I.V. (dl/g) | $T_g$ (°C.) |
| --- | --- | --- | --- | --- | --- | --- | --- | --- | --- | --- | --- | --- |
| | | PPP | PPE | EPE | PEP | PEE | EEE | C.I.(E) | C.I.(P) | | | |
| 1 | 32.5 | 0.235 | 0.259 | 0.181 | 0.27 | 0.05 | 0.004 | 0.31 | 0.82 | 0.833 | 1.1 | −43 |
| 2 | 28.7 | 0.289 | 0.285 | 0.139 | 0.247 | 0.037 | 0.002 | 0.28 | 0.88 | 0.864 | 0.8 | −35 |
| 3 COMP. | 0 | — | — | — | — | — | — | — | — | — | 2.3 | +0.5 |
| 4 COMP. | 0 | — | — | — | — | — | — | — | — | — | 2.44 | +0.5 |
| 5 | 12.3 | 0.66 | 0.18 | 0.038 | 0.115 | 0.005 | 0.003 | 0.27 | 0.97 | 0.919 | 1.22 | −17 |
| 6 | 13.6 | 0.596 | 0.23 | 0.038 | 0.127 | 0.009 | 0 | 0.25 | 0.97 | 0.934 | 1.36 | −18 |
| 7 | 5.5 | 0.828 | 0.106 | 0.011 | 0.055 | 0 | 0 | 0 | 0.99 | 1 | 1.32 | −13 |

What is claimed is:

1. An amorphous copolymer of propylene with ethylene, with a content of units derived from the ethylene of between about 1 and 32.5% by moles, in which less than 2% of the $CH_2$ groups in the polymer chain are present in $(CH_2)_n$ sequences where n is an even number and wherein the syndiotactic diads (r) are more numerous than the isotactic diads (m).

2. The copolymer according to claim 1, wherein the percentage molar content of ethylene in the copolymer (% E) and the ratio PEP/(PEP+PEE+EEE) satisfy the following relationship:

$$0.012\%\ E+PEP/(PEP+PEE+EEE) \geq 1$$

3. The copolymer according to claim 1, having a Cluster Index C.I.(E) value lower than 0.7.

4. The copolymer according to claim 1, having a value of intrinsic viscosity (I.V.) greater than 0.5 dl/g.

5. The copolymer according to claim 1, having a value of the ratio $M_w/M_n$ lower than 4.

6. The copolymer according to claim 1, having a glass transition temperature ($T_g$) value less than 0° C.

* * * * *